United States Patent [19]

Candle

[11] 4,235,120

[45] Nov. 25, 1980

[54] BELT AND METHODS OF MANUFACTURE AND SPLICING

[75] Inventor: Richard D. Candle, Akron, Ohio

[73] Assignee: The Goodyear Tire & Rubber Company, Akron, Ohio

[21] Appl. No.: 38,758

[22] Filed: May 14, 1979

[51] Int. Cl.³ .............................................. B65G 15/34
[52] U.S. Cl. .................................. 474/254; 24/31 W; 156/137; 198/847
[58] Field of Search ...................... 74/231 J, 232, 237; 198/847; 24/31 W; 156/137

[56] References Cited

U.S. PATENT DOCUMENTS

| | | | |
|---|---|---|---|
| 3,076,736 | 2/1963 | McHugh | 74/232 |
| 3,101,290 | 8/1963 | Paul | 156/137 |
| 3,234,611 | 2/1966 | Paasche | 74/232 X |
| 3,304,215 | 2/1967 | Paul | 156/137 |
| 3,481,807 | 12/1969 | Kanamori | 74/232 X |
| 3,693,218 | 9/1972 | Janbert et al. | 74/231 J X |
| 3,724,645 | 4/1973 | Spaar | 74/231 J X |
| 4,034,617 | 7/1977 | Guyer | 74/231 J |

Primary Examiner—C. J. Husar
Assistant Examiner—Conrad Berman
Attorney, Agent, or Firm—D. M. Ronyak

[57] ABSTRACT

In a belt there is provided an end region facilitating splicing or repair of the belt. The region includes a reinforcing core extending in the lengthwise direction of the belt and a separator layer. The separator layer is relatively non-adherent to the reinforcing core and facilitates removal of at least one of the outer cover layers for splicing or repair of the belt. The region is provided during manufacture of the belt.

25 Claims, 11 Drawing Figures

BELT AND METHODS OF MANUFACTURE AND SPLICING

The attached abstract is not to be taken as limiting the invention of this application and in order to understand the full nature and extent of the technical disclosure of this application reference must be made to the accompanying drawings and the following detailed description.

The present invention relates to a belt including an end region facilitating splicing or repair of the belt, a method of making same and a method of splicing a belt containing such an end region. The invention is particularly applicable to a long belt such as an endless conveyor or flat power transmission belt of the type having a reinforcing core interposed between a pair of outer cover layers. The core may include a plurality of steel or textile cables extending in the lengthwise direction of the belt and spaced apart from one another in the transverse direction of the belt, or at least two layers of reinforcing plies.

In known splicing methods, it is required that at least one of the outer cover layers of the belt be removed in order to expose the reinforcing core. Removal of such cover layer or layers has been a laborious operation requiring considerable time and primarily manual labor. The cover is typically cut away to expose the reinforcing core. With known belt constructions splicing or repair of the belt is very costly due to the considerable expenditure of manual labor and the down time of the belt. Also, when the core includes textile plies or cables, there is considerable danger of damage to the core as the cover layer is cut away.

It is a primary object of the invention to provide a novel belt construction to facilitate splicing or repair of the belt.

Another object of the invention is to provide a belt construction including an end region minimizing the amount of labor and down time needed for splicing or repair of the belt.

A further object of the invention is to provide a method of manufacture of a belt including an end region facilitating splicing or repair of the belt.

A still further object of the invention is to provide a method of splicing a belt including an end region facilitating access to the reinforcing core.

Briefly, a belt according to the invention is formed of elastomeric material and includes a reinforcing core. The core may include a plurality of reinforcing members extending in the lengthwise direction of the belt and spaced apart from one another in the transverse direction of the belt or at least two layers of elastomeric-coated reinforcing plies. Overlying the core is a pair of outer cover layers of elastomeric material. The belt further includes an end region facilitating splicing or repair of the belt. The end region includes a separator layer which is interposed between the reinforcing core and at least one of the outer cover layers facilitating removal of at least one of said cover layers.

A belt according to the invention may be manufactured by forming a reinforcing core covering at least a portion of the core in the end region with a separator layer and covering the core and separator layer with a pair of outer cover layers of elastomeric material which extend beyond the separator layer in the lengthwise direction of the belt to form an end surface of the belt. In a belt of the type including a reinforcing core including a plurality of reinforcing members spaced apart in the transverse direction of the belt, the separator layer is preferably coated with elastomeric material prior to its application to the reinforcing members such that the elastomeric material is in contact with said reinforcing core.

Conveyor belts of the type including an end region as herein described may be spliced by cutting through at least one of said outer cover layers in the end region, peeling off the separator layer to expose the reinforcing core at the belt ends, overlapping the ends of the reinforcing core, covering the members with uncured elastomeric material to fill the spaces between the ends of the core and to form a flat and continuous spliced region surface, and applying heat and pressure to the uncured elastomeric material.

Additional objects, features and advantages of the invention will appear in the following specification with reference being had to the drawings in which.

Figure 1:
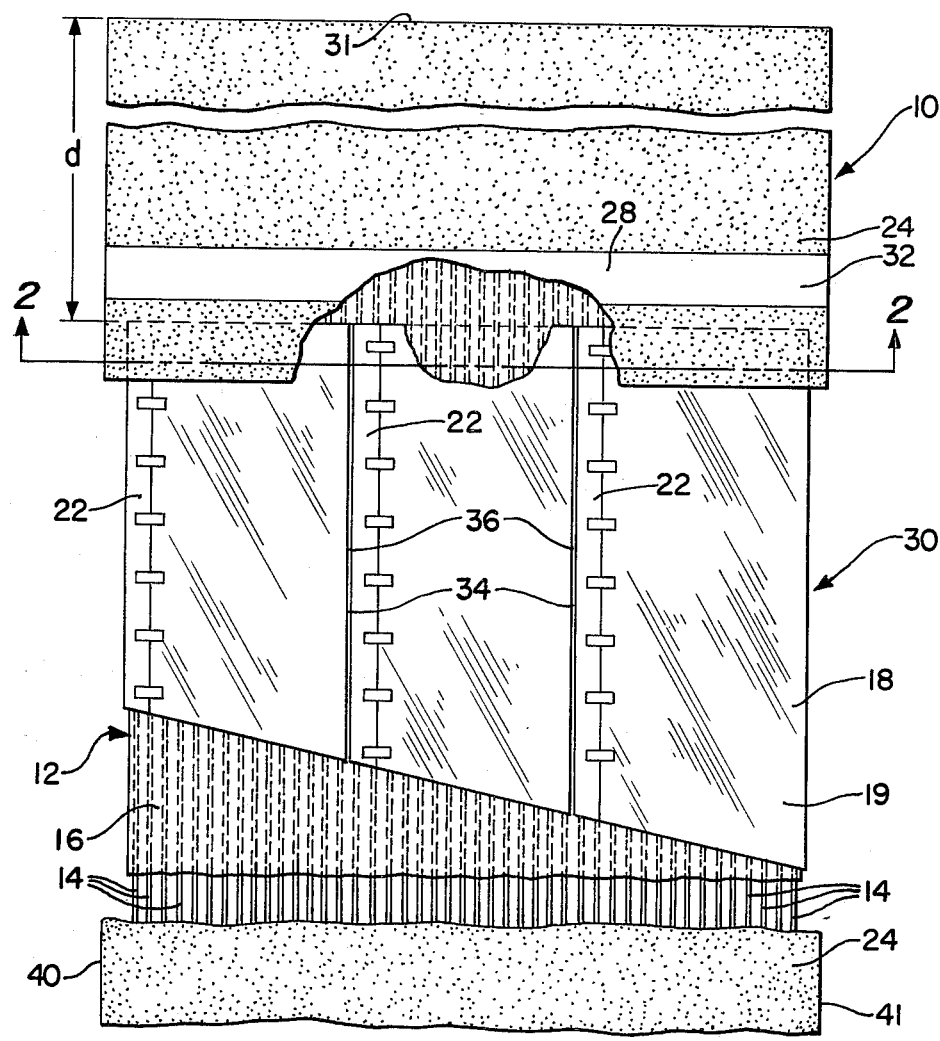
FIG. 1 is a fragmentary view of an end of a belt according to the invention with portions being broken away to better reveal the internal structure of the end region of the belt facilitating splicing or repair.
Figure 2:
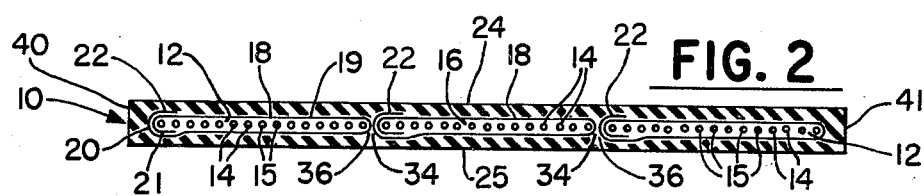
FIG. 2 is a cross-sectional view taken along line 2—2 of FIG. 1.

Referring to FIGS. 1 and 2, a belt 10 according to the invention includes an end region 30 facilitating splicing or repair including a core 12 comprising an array of mutually parallel reinforcing members 14 which extend in the lengthwise direction of the belt 10 and which are spaced apart from one another in the transverse direction of the belt. The core 12 may additionally include, as shown in FIG. 2, elastomeric material 16 which coats and adheres to the generally longitudinally extending reinforcing members of the core. The longitudinally extending reinforcing members 14 of the core 12 are typically cords, ropes or cables of metal or textile material. However, it is not intended that the invention be limited to these as it may be equally applied to those belts in which the reinforcing core additionally or alternatively includes reinforcements extending in the transverse direction of the belt, for example, woven fabrics of metal or textile material. Overlying at least one side of the core 12 is a separator layer 18 of a material which is relatively non-adherent to the core 12 such that it may be easily peeled of the core 12. The cables 15 of the core 12 and the elastomer 16 of the core in the remainder or body of the belt are the same as present in the end region. In a preferred embodiment, the separator layer 18 is in the form of a sheet 19 or a film. Suitable materials are those which exhibit relatively low adhesion to the cables 15 of the core 12 or to the elastomer layer 16 immediately surrounding the core cables 15. The separator sheet 19 or film must have sufficient resistance to withstand temperatures to which the end region 30 of the belt is subjected during manufacture of the belt.

Figure 3:
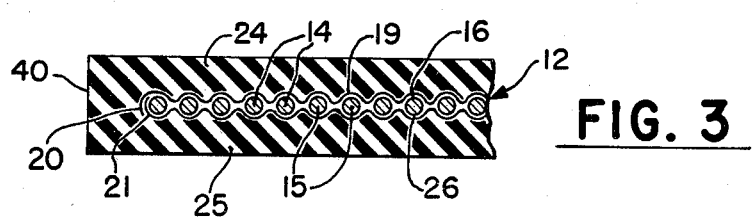
FIG. 3 is an enlarged cross-sectional view of a belt according to the invention after application of pressure to the end region.

The separator sheet 19 or film should be of sufficient mechanical strength to enable separation cleanly from the core 12 upon application of a peeling force. Clean separation means no fragments of the separator layer remain with the core after separation. To facilitate manufacture of the embodiment shown in FIG. 3, the separator sheet 19 preferably should have an elongation of at least fifty percent (50%) in the transverse direction of the belt. This enables the separator sheet 19 to stretch in the transverse direction of the belt to conform to the contours of the individual cables upon application of pressure during manufacture of the belt. An undulating separator layer configuration similar to that shown in FIG. 3 is desired to minimize the amount of rubber between adjacent cables which lessens the time required to separate the individual cables prior to their being overlapped and interleaved.

Suitable films or sheets include those of polytetrafluoroethylene available from the E I DuPont de Nemours and Company, Wilmington, Del., U.S.A., as Teflon TM FEP film, type A, general purpose. A polytetrafluoroethylene of the type described two mils (0.05 mm) in thickness has been successfully employed. Also suitable is polyester film or aluminum foil. Belts having splice facilitating end regions have been successfully prepared using polyester film or six mils (0.15 mm) thickness and aluminum foil of twelve mils (0.3 mm) thickness.

As previously stated, the separator layer 18 in the form of a sheet or film 19 may be placed in direct contact with the reinforcing members 14 of the belt 10 or in contact with the elastomer coated reinforcing members 14 of the belt 10. However, it has been found preferable to coat the film or sheet 19 with uncured elastomeric material which when cured adheres to the reinforcing members of the belt prior to incorporation of the sheet 19 into the belt 10. The pre-coated film or sheet 19 is applied directly to the bare reinforcing members 14 of the belt and preferably to both sides of the belt. A belt derived from this assembly is illustrated in FIG. 3. The ends 20,21 of the separator sheet 19 are overlapped so as to form a generally longitudinal seam 22 which is taped to hold the film 19 in place prior to application of the outer cover layer 24,25 of the belt. The outer cover layers 24,25 are applied to the end region 30 as they are throughout the remainder or body of the belt 10. Following layering up of the end region 30, the end region 30 is subjected to heat and pressure in a flat platen press in a manner known in the art. When pressure is applied to the end region 30 in which the elastomer-coated film 19 was applied to bare reinforcing cables of the core 12 the elastomer is forced into, around and between the reinforcing cables 15 and forms an elastomer coating 26 on each of the reinforcing cables 15. Only a minimal amount of elastomer is provided to the spaces between adjacent cables 15 (refer to FIG. 3). This feature results in additional time savings during preparation of the cable ends for field splicing and minimizes waste of elastomer material 16. Side edges 40,41 extend beyond the separator layer 18 in the transverse direction of the belt 10 to complete the seal of the core 12.

As shown in FIG. 1, at least one of the outer cover layers 24,25 of the belt 10 includes a marking 28 to locate the splice facilitating end region 30 of the belt 10. A highly suitable marking is obtained by placement of one or more strips 32 of elastomeric material of a color which contrasts with that of the adjoining outer cover layer 24. As an alternative to marking, the separator layer or layers may be positioned a predetermined amount (d) from the end surface 31 of the belt 10.

When a separator sheet or film 19 is employed in conjunction with a relatively wide conveyor belt 10, that is, one that is more than about two feet (60 cm) in width, it is preferable that the separator sheet 19 or sheets be discontinuous in the splice or repair region 30. The discontinuous separator layer 18 provides openings for elastomeric material connections 34 to occur between the outer cover layers 24,25 or between the elastomer layer which coats the reinforcing members and one or both of the outer cover layers (not shown). These elastomeric material connections 34 support the outer cover layers 24,25 against premature separation during transport of the belt end region 30 from the assembly station to the curing press and also during storage and handling in the field prior to removal of the separator layer or layers and outer cover layer or layers in preparation for splicing. These discontinuities 36 may appear, as shown in FIGS. 1 and 2, as a plurality of generally longitudinally extending strips. Alternatively, and not shown in the drawings, the discontinuities 36 in a separator sheet, or conversely stated, the connections 34 of the elastomeric material, may be in the form of strips extending in the transverse direction of the belt or in a randomly distributed pattern extending throughout the end region of the belt as created by the use of a separator layer having a plurality of holes spaced at intervals across its length and width.

Figure 11:
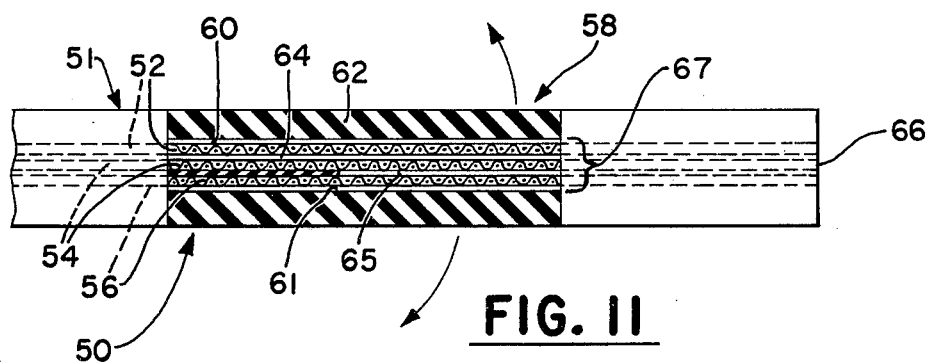
FIG. 11 is a side view of a belt according to another embodiment of the invention having a reinforcing core including three reinforcing ply layers.

A belt according to the invention may have multiple layers of elastomer-coated reinforcing plies. Referring to FIG. 11, the belt 50 includes three layers 52,54,56 of reinforcing plies of woven fabric. The end region 58 of the belt 50 includes a separator layer 60,61 on each side of the core 67. Overlying separator layers 60,61 respectively are outer cover layers 62,63. Interposed between each two adjacent ply layers in the end region 58 is an additional separator layer 64,65 of predetermined dimensions. The location of each additional separation layer 64,65 is also predetermined. The incorporation of the separator layers 60 and 61 facilitates removal of the outer cover layers 62,63. The additional separator layers 64,65 facilitates separation of reinforcing ply layers 52,54,56 from one another according to a predetermined patterns. Belt 50 includes an end surface 66 spaced in the longitudinal direction of the belt away from the separator layers. Terminating the separator layers 60,61,64,65 at a position spaced from the end surface 66 protects the core 67 against entry of foreign matter prior to field splicing.

In all belts according to the invention, it is desired that the separator layers should terminate at a position spaced from the belt end surface to prevent contamination of the reinforcing core by entry of foreign matter. To further protect the core against entry of foreign matter, the side edges of the belt (40,41 in FIG. 1, for example) should be of elastomeric material only. None of the reinforcing members or plies or separator layers are exposed in a preferred embodiment.

A conveyor belt 10 according to the invention which includes an end region 30 facilitating splicing or repair of the belt may be made by forming an array of mutually parallel reinforcing members 14. The reinforcing members 14 extend between two combs (not shown) which are spaced apart in the longitudinal direction of the reinforcing members 14. In the end region 30 the reinforcing members 14 are covered with a separator layer 18. Following application of the separator layer or layers, the core 12 and the separator layer 18 are covered with a pair of outer cover layers 24,25 of elastomeric material which envelops both the separator layer 18 and the core 12. Preferably, the outer cover layers 24,25 extend in the transverse direction of the belt 10 beyond any portion of the separator layer 18 or layers to insure complete sealing of the core 12 to prevent entry of foreign matter and contamination or deterioration of the core. The end region 30 of the belt 10 containing the separator layer 18 is preferably marked to facilitate later identification. The separator layer may be spaced a predetermined amount from the end surface 31. It is preferable that the reinforcing members 14 of the array be coated with elastomeric material which is adherent to the members. Coating of the reinforcing members 14 may be accomplished by coating the separator sheet 19 with uncured elastomeric material followed by placement of the separator sheet 19 against the uncoated reinforcing members 14 such that the elastomeric material contacts the members prior to covering the core with separator layer with outer cover layers.

After the core 12 is covered with the pre-coated separator sheet 19, the end region 30 is subjected to pressure to force the elastomer into, around and between the reinforcing members 14 and to form a coating 16 of elastomeric material on the reinforcing members 14.

A belt 50 having multiple layers of reinforcing plies may be manufactured to include a body portion 51 and an end region 58 facilitating splicing or repair of the belt. The body portion 51 is formed by providing a core 67 of multiple layers of reinforcing plies 52,54,56 which extend in the lengthwise direction of the belt 50. The core 67 is covered with elastomeric material which is adherent to the core 67 and forms outer cover layers 62,63. In the end region 58 facilitating splicing or repair of the belt 50 again there is formed a core 67 of reinforcing ply layers 52,54,56 extending in the lengthwise direction of the belt 50. In the end region 58 the core 67 is sealed against entry of foreign matter by the outer cover layers 62,63 and by end surface 66 which is spaced from the separator layers. In the end region 58 separator layers 60,61,64,65 are interposed between adjacent cover and core layers.

Figure 8:
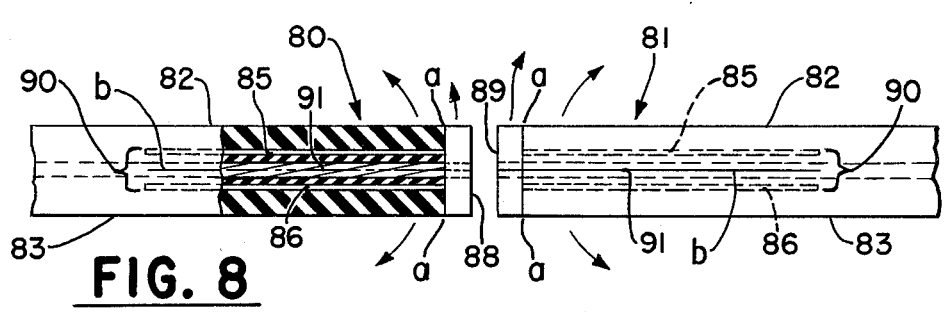
FIGS. 8–10 are side views illustrating steps in the splicing of a belt according to the invention including reinforcing members.
Figure 9:
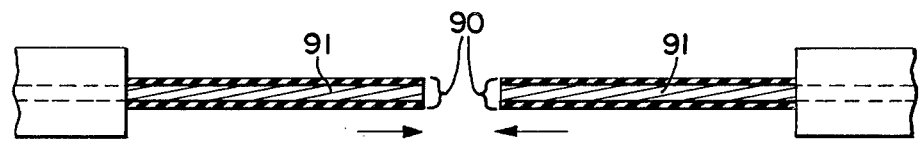
Figure 10:
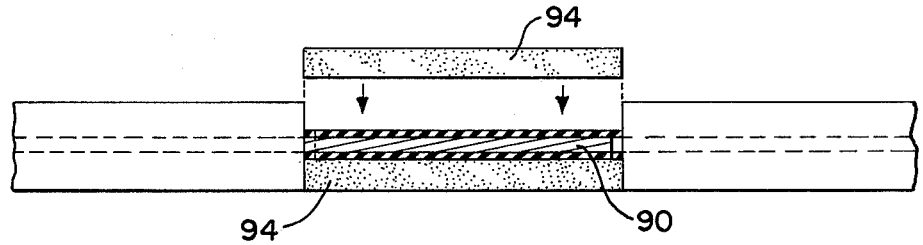

Referring to FIGS. 8, 9 and 10, steps of a method of splicing the end regions 80,81 of a belt or two belts according to the invention are illustrated. The outer cover layers 82,83 are cut through transverse to the belt direction or otherwise severed in the end region 80,81. Preferably, the first cuts (a) are made to a depth corresponding to the respective cover layer thickness at a position corresponding to the end of the separator sheets 85,86 nearest the end surface 88,89 of each belt end region 80,81. Secondary cuts (b) are made in the side edges in lengthwise direction of the belt which extend from the first cuts (a) away from the end surfaces 88,89. The outer cover layers 82,83 and separator layers 85,86 are then peeled back and off to expose the core 90 of each belt end region. The elastomer-coated cables 91 of the reinforcing core 90 are then cut to the desired length and bias angle. The exposed cable ends are overlapped. Uncured elastomeric material 94 is added to fill any spaces or voids between adjacent cables and to form a flat and continuous spliced region surface. Heat and pressure are applied to the uncured elastomeric material to complete the splice.

Where the reinforcing members during manufacture of the belt were elastomer coated with an elastomer that is adherent to the reinforcing members a relatively small quantity of uncured elastomeric material is required to fill the spaces between the exposed ends of the reinforcing members, and additional elastomeric material, which may be of a different composition is added to form a flat and continuous spliced region surface; that is, to form outer cover layers of the belt in the spliced region. Where the belt as manufactured includes in its splice facilitating end region reinforcing members which are not coated with adherent elastomeric material a greater quantity of such material is added to the region during the splicing operation after which additional material to form the outer covers is provided. Of course, a single elastomeric composition may be employed to bind the reinforcing members in the spliced region and form the outer cover layers. After application of the uncured elastomeric material in the splice region there is applied heat and pressure to cure the uncured elastomeric material. A portable flat platen press is typically employed to perform this step.

When a belt including multiple layers of reinforcing plies is to be spliced, a similar procedure is followed. Referring to FIG. 11, the outer covers 62,63 are severed at a position corresponding to the ends of the separator sheets 60,61 nearest the end surface 66 of each belt end. Secondary cuts are made in the side edges in the lengthwise direction of the belt 50 which extend from the first cuts away from the end surface 66. The outer cover layers 62,63 are peeled back and off to expose the core 67. The portion 51 of the belt 50 between the separator layers and the end surface 66 is severed completely and discarded. The ply layers 52,54 and 56 of the reinforcing core 67 are then separated and the additional separator sheets 64,65 removed. The ply layers are trimmed to the required length and bias angle and the splice is completed. Uncured elastomeric material is added to fill any spaces or voids and to form a flat and continuous spliced region surface. Heat and pressure are applied to the uncured elastomeric material to complete the splice.

Specific splicing patterns for the reinforcements are not given in these examples as these are well known to belt manufacturers. The specific arrangement of the reinforcing members or ply layers is beyond the scope of this disclosure.

Figure 4:
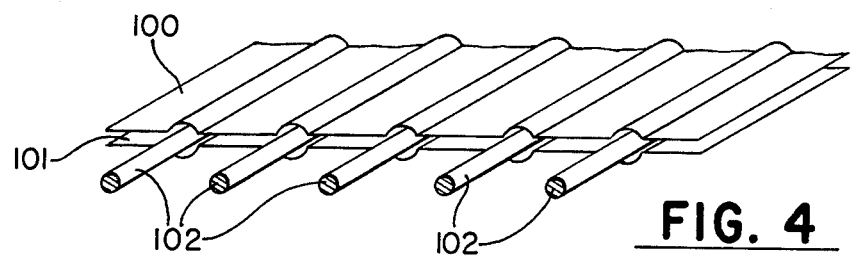
FIGS. 4–7 are fragmentary perspective views illustrating various ways of covering the reinforcing core of belts including reinforcing cables to facilitate access to them for splicing or repair of the belt.

When a sheet or film is employed as a separator layer many varied configurations may be employed to isolate the reinforcing members from the outer cover layer or layers. Referring to FIG. 4 two sheets 100,101 are employed, one on either side of the belt core 102. When pressure is applied to the region the sheets are compressed toward one another between adjacent reinforcing members. In an embodiment similar to that shown in FIG. 4 the separator layers may be extended in the transverse direction of the belt to reach beyond the transverse extent of the outer cover layers which makes location of the splice facilitating region relatively easy. However, this feature is not preferred because there is a possibility that the separator layers may prematurely separate from the core 102 prior to field splicing and thus permit contamination or deterioration of the core in the end region. It is preferred that the separator sheets 101,102 not extend in the transverse direction of the belt beyond the outer covers or sealing layer and that a separate marking be provided, if needed, to identify the end region.

Figure 5:
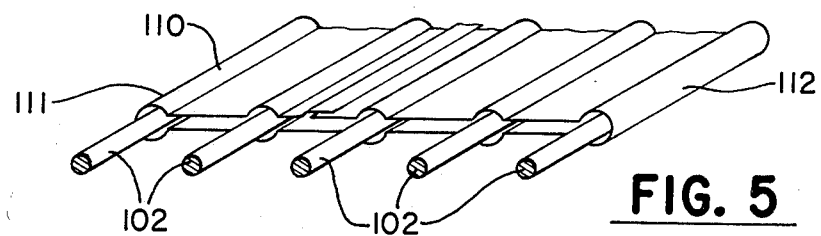

In the embodiment shown in FIG. 5 a single separator sheet 110 has been wrapped around the core 102 such that both sides of the core 102 and both side edges 111,112 are covered. This is a preferred embodiment when a separator sheet or film is employed. When applied to a belt 10 of great width as shown in FIG. 1, it is preferred that the separator sheet 19 not extend continuously over either side of the entire splice facilitating end region 30. Making the separator sheet 19 discontinuous in the end region 30 enables the elastomeric material of the outer cover layers 24,25 to connect at the discontinuities 36 and provides sufficient bond to facilitate further processing, handling and storage prior to splicing of the belt 10 in the field, without likelihood of premature separation.

Figure 6:
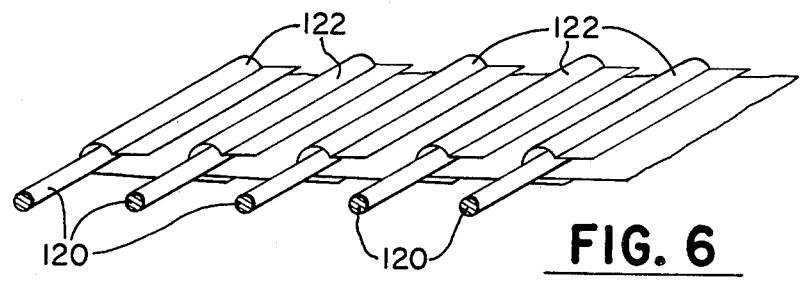
Figure 7:
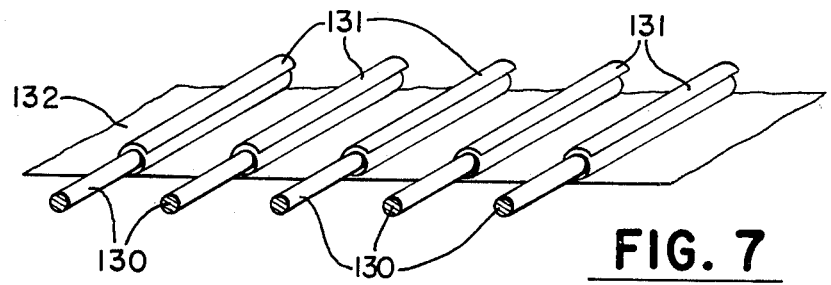

In the embodiment shown in FIG. 6 each reinforcing member 120 is enveloped by its respective separator sheet 122 which is of sufficient transverse dimension to extend at least to the adjacent reinforcing member. In the embodiment shown in FIG. 7, each reinforcing member 130 is individually wrapped in a separator sheet 131 which is rolled about the reinforcing member 130. There is additionally provided a generally planar separator sheet 132 which extends in the transverse direction of the belt across a plurality of reinforcing members 130.

Other configurations of the separator sheet relative to the belt reinforcements are, of course, possible and, these too, are within contemplation of the invention.

The terms "adhering to", "adherent" and related forms as used herein mean that a relatively high degree of bonding is achieved or present between the components or layers.

The terms "non-adherent", "non-adhering" and related forms as used herein mean that a relatively low degree of bonding is achieved or present. The separator layer material is chosen so the layer will be relatively non-adherent to the layers with which it is in contact, and certainly will exhibit a lesser degree of adhesion than the elastomeric material layers would otherwise exhibit to each other or to the core if no separator sheet was interposed between them.

While certain representative embodiments and details have been shown for the purpose of illustrating the invention, it will be apparent to those skilled in the art that various changes and modifications may be made therein without departing from the spirit or scope of the invention.

What is claimed is:

1. In an elastomeric belt having a reinforcing core extending in the lengthwise direction of the belt, and a pair of outer cover layers of elastomeric material,
   an end region facilitating splicing or repair of the belt,
   an end surface on said end region,
   a separator layer in said end region interposed between said core and at least one of said outer cover layers for facilitating removal of one of said cover layers from said core during splicing or repair, said separator layer terminating at a position spaced from said end surface to protect said core against entry of foreign matter.

2. A belt according to claim 1, wherein the separator layer includes a sheet of polytetrafluorethylene, polyester or aluminum.

3. A belt according to claim 1, wherein said separator layer is located at a predetermined distance from the end surface of the belt.

4. A belt according to claim 1, wherein the separator layer is totally enveloped and sealed against entry of foreign matter by said cover layers.

5. A belt according to claim 1, wherein said core includes a plurality of reinforcing members spaced apart from one another in the transverse direction of the belt.

6. A belt according to claim 5, wherein said core further includes elastomeric material coating and adhering to said reinforcing members.

7. A belt according to claim 5 or 6, wherein the reinforcing members include cables of metallic or textile material.

8. A belt according to claim 6, wherein said separator layer undulates in the transverse direction of the belt, being farther away from the center of said core where it overlies a reinforcing member and being nearer to the center of said core between adjacent reinforcing members.

9. A belt according to claim 1, wherein said core includes at least two layers of elastomer-coated reinforcing plies.

10. A belt according to claim 9, wherein at least one additional separator layer is interposed between two of said ply layers in said end region.

11. A belt according to claim 10, wherein each of said separator layers is of predetermined dimensions and position relative to the adjacent end surface of the belt.

12. A belt according to claim 1, wherein at least one of the outer cover layers includes a visible marking to identify said region.

13. A belt according to claim 12, wherein the marking comprises at least one strip of elastomeric material of a color which contrasts with that of the adjoining cover layer.

14. A belt according to claim 1, wherein the separator layer is discontinuous at spaced locations throughout said end region, providing openings for elastomeric material connections to support at least one of said cover layers.

15. A belt according to claim 14, wherein the connections include strips extending in the longitudinal direction of the belt.

16. A belt according to claim 14, wherein the connections include strips extending in the transverse direction of the belt.

17. A method of manufacture of an elastomeric belt including an end region facilitating splicing or repair of said belt, said method comprising the steps of:
   (a) forming a reinforcing core,
   (b) covering at least a portion of said core in said end region with a separator layer,
   (c) covering said core and said separator layer with a pair of outer cover layers of elastomeric material which extend beyond said separator layer in the lengthwise direction of the belt to form an end surface of said belt.

18. The method of claim 17, wherein said core includes a plurality of reinforcing members spaced apart from one another in the transverse direction of the belt, further comprising coating said reinforcing members with elastomeric material which is adherent to said member prior to covering said core with said separator layer.

19. The method of claim 17, wherein said separator layer comprises a sheet material, further comprising coating said separator layer with an elastomeric material which is adherent to said reinforcing core and applying said coated layer to said core such that the elastomeric material is in contact with said reinforcing core.

20. The method of claim 17, wherein said core includes at least two layers of elastomer-coated reinforcing plies, further comprising, interposing at least one additional separator layer between two of said ply layers.

21. The method of claim 17 or 20 wherein each separator layer is of predetermined dimensions, further comprising, positioning each of said separator layers a predetermined amount from said end surface of said belt.

22. The method of claim 17, 18 or 20 further comprising, providing elastomeric material connections at spaced locations in said end region to support at least one of said outer cover layers.

23. The method of claim 17, further comprising, marking at least one of said outer cover layers to identify said end region.

24. The method of claim 17 or 19, further comprising, applying pressure to said end region after provision of said separator layer to said core.

25. A method of splicing belts of the type having an end region including a reinforcing core interposed between a pair of outer cover layers and a separator layer overlying at least a part of said core, the method including the steps of:
   (a) cutting through at least one of said outer cover layers in said end region,
   (b) peeling off said separator layer and said cover layer to expose the reinforcing core,
   (c) overlapping the exposed ends of said core,
   (d) providing uncured elastomeric material to fill the spaces between the exposed overlapped ends of said core and to form a flat and continuous spliced region surface, and
   (e) applying heat and pressure to said uncured elastomeric material.

* * * * *